United States Patent Office 3,517,039
Patented June 23, 1970

3,517,039
PROCESS FOR PREPARING ACYLATED UREA DIISOCYANATES
Kuno Wagner, Leverkusen, Ernst Meisert, Leverkusen-Schlebusch, and Gerhard Mennicken, Opladen, Germany, assignors to Farbenfabriken Bayer Aktiengesellschaft, Leverkusen, Germany, a corporation of Germany
No Drawing. Filed May 23, 1966, Ser. No. 551,916
Claims priority, application Germany, May 24, 1965,
F 46,137
Int. Cl. C07c 69/00
U.S. Cl. 260—404.5          11 Claims

ABSTRACT OF THE DISCLOSURE

Acylated urea polyisocyanates are prepared by reacting an organic diisocyanate with an organic monocarboxylic acid containing more than one carbon atom at a temperature of from about 90° C. to about 190° C. These products may be used in the manufacture of heat resistance foam plastics or polyurethane elastomers.

---

This invention relates to polyisocyanates containing urea groups, particularly acylated urea polyisocyanates, and more particularly, to a process for preparing acylated urea polyisocyanates.

It is known that acid amides are obtained by reacting monoisocyanates with monocarboxylic acids. Organic polyisocyanates containing a biuret structure are obtained by reacting organic diisocyanates with water. It is possible to use in addition to water, hydrogen sulfide or urea diisocyanates, all of said reactions being preferably carried out at temperatures of from about 70° C. to 200° C. In addition to water, it is also possible to use compouns which give off water, especially dicarboxylic acids which which readily change into the anhydrides. Aliphatic isocyanates and aliphatic acids usually yield mixed anhydrides that subsequently decompose to substituted amides. On the other hand, aromatic isocyanates combine with aliphatic acids or weak aromatic acids at moderate temperatures to give other anhydrides and water which in turn further reacts with the isocyanates. Consequently, this reaction process provides for the formation of copious quantities of urea and/or biuret derivatives as well as acid amide derivatives.

In order to avoid these side reactions in the formation of polyisocyanates, it has been suggested that the formation of anhydrides and water could be substantially reduced and even eliminated by reacting particular aliphatic dicarboxylic acids having more than 5 carbon atoms with at least 4 mols of an aliphatic diisocyanate per mol of acid. However, this process was limited to special aliphatic dicarboxylic acids having more than 5 carbon atoms to the molecule.

It is an object of this invention to provide a process for the preparation of polyisocyanates. Another object of this invention is to provide a process for preparing polyisocyanates having acylated urea structures. Another object of this invention is to provide a process for preparing polyisocyanates without the formation of anhydrides. Still another object of this invention is to provide a process for preparing polyisocyanates substantially free of by-products. A further object of this invention is to provide a process for preparing acylated urea polyisocyanates having valuable lacquer properties. A still further object of this invention is to provide a process for preparing high molecular weight polyisocyanates which may be easily separated from monomeric isocyanates.

The foregoing objects and others which will become apparent from the following descrition are accomplished in accordance with the invention, generally speaking, by providing a process for the preparation of acylated urea polyisocyanates wherein an organic diisocyanate is reacted with an organic monocarboxylic acid containing more than one carbon atom at a temperature of from about 90° C. to about 190° C., in a mol ratio of at least 4 mols of an organic diisocyanate per mol of an organic mnocarboxylic acid so that at least 2 mols of diisocyanate are present in excess after cmpletion of the reaction.

The process of this invention yields an acylated urea polyisocyanate having the following formula

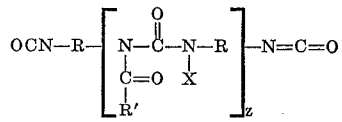

wherein R is an organic group such as aliphatic, cycloaliphatic, araliphatic or aromatic radical, R' is an organic group which may be substituted or unsubstituted aliphatic, cycloaliphatic, araliphatic or aromatic radicals, X is hydrogen or —CO—NH—R—N=C=O, and z is an integer of from 1 to 5. The organic group represented by R' may be substituted with halogen atoms such as chlorine, bromine, fluorine and iodine, nitro groups and groups having the following formula

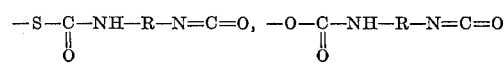

and

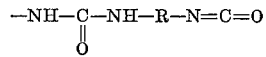

wherein R is the same as defined above.

In reacting an organic diisocyanate with an organic monocarboxylic acid, at least 4 mols of organic diisocyanate should be reacted with 1 mol of an organic monocarboxylic acid at a temperature of from 90° C. to 190° C,. preferably from 130° C. to 165° C. While at least 4 mols of organic diisocyanate should be present per mol of organic monocarboxylic acid, it is more advantageous to use larger excesses of organic di-isocyanates, i.e. preferably from about 6 to 15 mols of monomeric organic diisocyanates per mol of monocarbxylic acid. When a large excess of organic diisocyanate is used, the diisocyanate functions as a solvent for the reactants and for the acylurea product thus formed. After completing the reaction, the monomeric organic diisocyanate may be separated by conventional processes, such as, distillation, thin-film evaporation or extraction from the urea polyisocyanate product.

Alternatively, one may carry out the reaction in the presence of an inert organic solvent. By inert is meant organic solvents which are free of active hydrogen containing groups capable of reacting with NCO groups. Use of a solvent is sometimes advantageous to moderate the reaction by dilution and by reflux distillation of the solvent and to facilitate purification of the product. If a solvent is used it should preferably dissolve all of the reactants, but it should not react with the reactants or the products to any significant extent. In addition, it should not unduly retard the rate of reaction and should be easily separable from the reaction product. Thus, solvents which may be employed are for example, aliphatic or aromatic hydrocarbons having a boiling point within the reaction temperature, such as, ligroin, natural or synthttic hydrocarbon mixtures (B.P. above 50° C.), benzene, xylene, chlorobenzene, o-dichlorobenzene, toluene and the like. One may also use esters such as ethyl acetate, ethyl glycol acetate, butyl acetate, methyl glycol acetate, butyl glycol acetate, dioxane, tetrahydrofurane, dibutyl ether and the like.

The reaction between the monocarboxylic acid and the diisocyanates proceeds rather rapidly and smoothly with the evolution of stoichiometric quantities of carbon dioxide. The reaction time should be sufficient for the complete evolution of carbon dioxide and may range from about 15 minutes up to about 24 hours, depending on the reaction temperature.

Thus, when an organic diisocyanate is reacted with a monocarboxylic acid, carbon dioxide is evolved without the formation of anhydrides or water. The products thus obtained are free from biuret triisocyanates and their highly branched homologues. Furthermore, it is surprising that the products of this process, both by reaction with one another and with the monomeric diisocyanates show a surprisingly small tendency to convert into triisocyanates and polyisocyanates through their NH— groups to form high molecular weight polyisocyanates having biuret structures. Consequently, high yields of acylated urea diisocyanates were obtained even in the presence of an excessive amount of diisocyanate and elevated temperatures for a relatively long period of time. In contrast to polyisocyanates which are trifunctional or higher, these polyisocyanates can advantageously be used for the formation of high molecular weight polyurethanes, e.g., plastics, elastomers, coatings and lacquers, especially where a linear structure having relatively small amounts of branching and stronger elasticization effects are desired in the final products.

In order to obtain particularly homogeneous products, the organic monocarboxylic acid should be reacted in a low concentration at a temperature higher than about 90° C. with large quantities of excess diisocyanates. In addition, at least 2 mols of excess diisocyanate for each mol of acylated urea polyisocyanate should be present at the completion of the reaction. When the process is carried out in this manner, it is possible to determine by analyzing the off-gas and the products of this process to prove that the reaction products do not contain biuret polyisocyanates nor monofunctional imide isocyanates having the following structure:

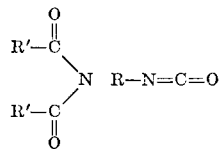

which would prevent the production of high molecular weight polyurethanes because of their chain-breaking tendency during polyaddition reactions.

In a preferred embodiment of this invention, acylated urea diisocyanates are prepared in which z is equal to 1 and X represents hydrogen. In this embodiment, the addition of the aliphatic, cycloaliphatic, araliphatic or aromatic monocarboxylic acid (which is gaseous, liquid or solid form or dissolved in neutral solvents) to the reaction is effected in such a way that, from the commencement of the reaction, e.g. at 130° C., the monocarboxylic acid is added as a function of time equivalent to the evolution of $CO_2$. The concentration of the monocarboxylic acid in the reaction medium never exceeds 0.8 percent by weight and, on completion of the reaction, there are at least 2 mols of excess monomeric isocyanate present in the reaction mixture.

Especially suitable as aliphatic and cycloaliphatic diisocyanates are the tetra-, penta- and hexamethylene diisocyanates, 1,4- and 1,3-diisocyanatocyclohexane, 4,4'-diisocyanatodicyclohexylmethane, xylylidene diisocyanate and 1,2-diisocyanatocyclobutane. Depending on the diisocyanates employed, different liquid, waxy or crystalline acylated urea diisocyanates can be prepared in monomer-free form in accordance with the process of this invention. Especially suitable aromatic diisocyanates are 1-methylbenzene-2,4-diisocyanate, 1-methylbenzene-2,6-diisocyanate and their technical mixtures and chlorination products, 1-methoxybenzene-2,4-diisocyanate and 1-chlorobenzene-2,4-diisocyanate, and their alkyl-substituted and chlorine-substituted derivatives. Other diisocyanates which may be employed, are for example, diphenylmethane-4,4'-diisocyanate, p-phenylenediisocyanate and m-phenylenediisocyanate. In general, the products obtained from the aforesaid aromatic diisocyanates constitute spring-hard resins similar to colophony and have excellent solubility in the usual solvents employed in the lacquer industry.

Any suitable monocarboxylic acid having more than one carbon atom may be employed in carrying out the process according to the present invention. Examples of suitable monocarboxylic acids are aliphatic, cyloaliphatic, araliphatic and aromatic saturated and unsaturated monocarboxylic acids such as acetic acid, monochloracetic acid, dichloracetic acid, methylethyl acetic acid, diethylacetic acid, ethoxyacetic acid, cyanacetic acid, propionic acid, 3-chloroproprionic acid, butyric acid, isobutyric acid, n-valeric acid, isovaleric acid, 2-ethyl caproic acid, lauric acid, myristic acid, palmitic acid, stearic acid, levulic acid, and unsaturated acids such as coconut fatty acid, tall oil acid, undecylenic acid, crotonic acid, oleic acid, sorbic acid, linseed oil fatty acids and even acrylic and methacrylic acids. Examples of other monocarboxylic acids which may be employed if polymerization inhibitors are present up to about 1% of the reaction mixture are hexahydrobenzoic acid, 3,4,5,6-tetrahydrobenzoic acid, phenylacetic acid, benzoic acid, 2,4-dichlorobenzoic acid and isomers, 2-methylbenzoic acid, 3- and 4-methoxybenzoic acid and p-dimethylaminobenzoic acid.

Monocarboxylic acid semiesters of aliphatic, cycloaliphatic and aromatic dicarboxylic acids may also be employed. Examples of these semiesters are monomethyl succinate, monomethyl and monobutyl maleate, monoesters of fumaric acid, monoethyl hexahydrophthalate, monoesters of tetrahydrophthalic acid, and monobutyl endomethylenetetrahydrophthalate, and monoesters of chlorinated cyclic carboxylic anhydrides, such as those formed in accordance with the Diels-Alder reaction, may also be employed. Examples of these monoesters are those formed from hexachlorocyclopentadiene and maleic anhydride; corresponding monoesters of phthalic anhydride, e.g. the monooctyl ester of phthalic acid, or monoesters of isophthalic acid and corresponding semi-esters of dimerized unsaturated fatty acids.

In addition, N-disubstituted semiamides of aliphatic, cycloaliphatic and aromatic dicarboxylic acids, such as those obtained for example, from the reaction of succinic anhydride or tetrahydrophthalic anhydride with dimethylamine, diethylamine or di-n-butylamine or corresponding semiamides of dimerized unsaturated fatty acids may also be employed in the present invention.

Monocarboxylic acids which deserve particular mention are 2-ethylcaporic acid, the monoesters or monoamides of hexahydrophthalic acid and the Diels-Alder adduct of hexachlorocyclopentadiene and maleic anhydride. Particularly suitable diisocyanates are hexamethylene diisocyanate and the technical isomer mixtures of toluylene-2,4- and 2,6-diisocyanates. As combinations, it is preferred that hexamethylene diisocyanate and acetic acid, as well as hexamethylene diisocyanate and tall oil fatty acids be used.

According to one particular embodiment of the process it is also possible to introduce derivatives of the aforesaid carboxylic acids which also comprise in the molecule functional groups which are reactive with isocyanates, such as, for example, OH—, SH— and substituted or unsubstituted $NH_2$— groups or hydrizide groups. When using such monocarboxylic acids, branched polyisocyanates having a higher functionality and containing additional urethane or thiourethane groups, urea and biuret groups or semicarbazide groups are obtained. Derivatives of these carboxylic acids are, for example, hydroxyacetic acid, thioglycolic acid, recinoleic acid, 6-amino-1-caproic acid, methylamino caproic and dimethylaminocaproic acids, hydrogenated p-aminobenzoic acid, adipic acid monohydrazide, adipic acid monoamide, phthalic acid semiamide isophthalic acid semiamide.

Finally, the products of the process can be further modified by carrying out the reaction in the presence of relatively small quantities of compounds having reactive hydrogen atoms or even by concurrently using mixtures of different diisocyanates or polyisocyanates of higher functionality (such as triisocyanates and tetraisocyanates derived from aniline and formaldehyde) or biuret triisocyanates (for example, those derived from hexamethylene diisocyanate and water or tertiary butanol). For example, in order to modify the reaction products, it is possible to use concurrently relatively small quantities of water, tertiary butanol, glycols, methylamine, butylamine, oleylamine, allylamine, dimethyl urea phenylbutyl urea, formic acid, monocarboxylic and dicarboxylic diamines, carbodihydrazide, hydrazine monocarboxylic acid ethyl ester, adipic acid dihydrazide, w-hydroxycaproic acid hydrazide, oxalic acid, adipic acid, dimethylol urea, polyesters, polyethers, polythioethers or polyacetals with terminal hydroxyl groups.

Furthermore, products modified with biuret polyisocyanates may be obtained by reacting one mol of a monocarboxylic acid, e.g. acetic acid, with 1 to 2 mols of an organic diisocyanate at a temperature of from 20° C. to 40° C. to form acylamide monoisocyanates, water and acid anhydrides; then reacting the water thus formed in a subsequent reaction to produce urea diisocyanates and thereafter raising the temperature to from about 90° C. to 190° C. in accordance with the process of this invention to react the excess diisocyanate with the reaction products to form a composition containing biuret polyisocyanates in addition to the acylated urea polyisocyanates of this invention.

In addition, other modifications of the products of this invention can be obtained by carrying out the reaction in the presence of catalysts, such as tertiary organic bases, metal salts, phosphines, ethylene imine derivatives, or tertiary amine salts of monocarboxylic acids, e.g. trimethyl amine salts. By this process the products are further modified by the introduction of isocyanurate groups, uretdione groups or carbodiimide groups.

The process according to the invention is carried out, preferably by slowly introducing the monocarboxylic acids while stirring into a monomeric diisocyanate heated to from about 90° C. to 190° C. and more preferably, from about 130° C. to about 165° C., following the course of the reaction by measuring the amount of $CO_2$ evolved and introducing the carboxylic acid in gaseous, liquid or solid form or in the form of a solution in neutral organic solvents in proportion to the evolution of $CO_2$ so that the concentration of free acid in the reaction medium at no time is greater than 0.8% by weight of the reaction medium. The amount of organic diisocyanate to monocarboxylic acid is critical, and at least 4 mols of diisocyanate must be employed per mol of monocarboxylic acid. Generally, 6 to 15 mols of the diisocyanate are used per mol of the monocarboxylic acids for this purpose.

The products of the process are generally soluble in organic solvents, such as acetone, dioxane, tetrahydrofuran, benzene, xylene, ethyl acetate and ethyl glycol acetate. When using unsaturated acids, such as linolenic or linoleic acids, ricinoleic acid or tall oil fatty acid, the products of the process usually have good compatability with benzine hydrocarbons.

The products can be used as crude solutions in an excess of diisocyanates, or as mixtures thereof, or even in isolated form for the manufacture and modification of plastics by the isocyanate polyaddition process. For example, these products may be used in the manufacture of heat resistant foam plastics or polyurethane elastomers. On the other hand, after they have been isolated and freed from monomeric diisocyanates, whether by thin-film distillation or by extraction processes, they can be used as physiologically neutral polyisocyanates for the production of elasticized lacquer coatings, alone or in combination with conventional triisocyanates. When starting with aliphatic, cycloaliphatic and araliphatic isocyanates, the urea diisocyanates acylated with aliphatic and cycloaliphatic monocarboxylic acids constitute high quality starting materials with an elasticizing action for the production of one-component lacquer coatings having excellent light fasteners, and resistance to weather influences and chalking. In addition, these acylated urea diisocyanates may be combined with known polyhydroxyl compounds to form light fast lacquers and coatings having excellent resistance to weathering.

The invention is further illustrated by the following examples in which all parts and percentages are by weight unless otherwise specified.

EXAMPLE 1

Approximately 504 parts of hexamethylene diisocyanate are heated to about 140° C. While stirring, about 30 parts of anhydrous acetic acid are added dropwise over a period of about 5 hours, the acetic acid being added in a quantity equivalent to the quantity of $CO_2$ being formed, this being measured by means of a gas meter. The quantity of $CO_2$ split off is about 11 liters. The crude product thus obtained is freed from excess hexamethylene diisocyanate by thin-film distillation at a temperature of about 160° C./0.4 mm. Hg in a nitrogen atmosphere. About 170 parts of a liquid oil which is golden yellow in color are obtained, which is identified as monoacetylated urea diisocyanate. Percent NCO calculated: 23.9; percent NCO found: 22.4.

The diisocyanate is completely soluble in ethyl acetate or a mixture of ethyl glycol acetate and xylene (1:1). The 75% solution has a viscosity of 53 cp./25° C. Lacquers prepared therefrom with polyhydroxyl compounds show excellent elasticity.

EXAMPLE 2

The procedure of Example 1 is repeated, except the hexamethylene diisocyanate is replaced with about 522 parts of 1-methylbenzene-2,4-diisocyanate. Approximately 170 parts of a colophony-like, brittle resin is obtained. The produce has an NCO— content of 22.3% and shows excellent solubility in ethyl acetate. With polyhydroxyl compounds e.g. polyesters of phthalic acid and trimethylolpropane, it yields lacquer coatings which have good elasticizing properties and are resistant to chemicals.

EXAMPLE 3

Approximately 504 parts of hexamethylene diisocyanate are heated to about 170° C. While stirring about 72 parts of 2-ethyl caproic acid are introduced dropwise over a period of about 5 hours. After the evolution of $CO_2$ has ceased, the crude product is freed from excess hexamethylene diisocyanate by a thin-film distillation at a temperature of about 160° C./0.4 mm. Hg in a nitrogen atmosphere. About 214 parts of a thinly liquid oil which is golden yellow in color are obtained, which is identified as a monoacylated urea diisocyanate having an NCO content of 18.3%. A 75% solution in ethyl acetate has a viscosity of 68 cp./25° C.

EXAMPLE 4

The procedure of Example 3 is repeated, except the hexamethylene diisocyanate is replaced with about 522 parts of an isomeric mixture of about 35 parts of 1-methylbenzene-2,6-diisocyanate and about 65 parts of 1-methylbenzene-2,4-diisocyanate. Approximately 218 parts of a colophony-like, golden yellow resin is obtained. The product has an NCO— content of 17.9% and is soluble

EXAMPLE 5

Approximately 840 parts of hexamethylene diisocyanate are heated to about 150° C. The procedure of Example 1 is used except the acetic acid is replaced with about 290 parts of tall oil fatty acid which is introduced dropwise over a period of about 9 hours. The reaction mixture is then heated to about 170° C. for an additional hour. The crude product thus obtained is freed from monomeric hexamethylene diisocyanate by a thin-film distillation, as in Example 1. About 575 parts of a viscous, resinous polyisocyanate is obtained, percent NCO: 13.6. The product has a viscosity of 732 cp./40° C. and has excellent solubility in all lacquer solvents. The product is brushed on supports and dried in the air, thus providing a light-fast hard and elastic lacquer coating on the basis of a one-component system.

EXAMPLE 6

The same procedure is used as in Example 5, except the hexamethylene diisocyanate is replaced with about 870 parts by weight of a technical isomer mixture containing about 20 parts of 1-methylbenzene-2,6-diisocyanate and about 80 parts of 1-methylbenzene-2,4-diisocyanate. About 590 parts of a urea diisocyanate modified with the tall oil fatty acid radical are obtained. The resinous product is soluble in usual lacquer solvents and has an NCO— content of 14.1%.

EXAMPLE 7

Approximately 1,000 parts of hexamethylene diisocyanate are heated to 150 C. The procedure of Example 1 is followed except the acetic acid is replaced with about 307 parts of ricinoleic acid which is introduced dropwise into the reaction mixture over a period of about 4 hours. The crude product obtained is freed from excess hexamethylene diisocyanate by thin-film distillation at 150° C./0.4 mm. Hg in a nitrogen atmosphere. About 610 parts of a resin-like, viscous polyisocyanate is obtained which has an NCO— content of 15.8%.

EXAMPLE 8

Approximately 500 parts of hexamethylene diisocyanate and about 0.5 part of phenthiazine are heated to about 130° C. over a period of about 3 hours about 36 parts of acrylic acid are added dropwise to the reaction mixture and the temperature is maintained for an additional 3 hours. The crude product thus obtained contains about 42.5% of NCO. By thin-film distillation at 150° C./0.1 mm. Hg, excess hexamethylene diisocyanate is removed, leaving about 200 parts of a viscous liquid. The polyisocyanate thus obtained contains only a small proportion of polyisocyanates formed from vinyl polymerization. It has an NCO content of 21.3%.

EXAMPLE 9

The procedure is the same as in Example 8, except that the acrylic acid is replaced with about 43 parts of methacrylic acid. About 210 parts of a polyisocyanate having an NCO content of 20.1% is obtained.

EXAMPLE 10

Approximately 840 parts of tetramethylene diisocyanate are heated to about 135° C. Over a period of about four hours about 69 parts of hexahydrobenzoic acid are added dropwise and the reaction mixture is heated for an additional two hours at 140° C. The reaction mixture is thereafter treated in a thin-film evaporator at about 160° C./0.1 mm. Hg and freed from tetramethylene diisocyanate. A viscous resin (about 180 parts) obtained as a distillation residue is tough, odorless and colorless and suitable for the production of light-fast lacquer coatings. NCO content 20.1%.

EXAMPLE 11

Approximately 500 parts of cyclohexane-1,4-diisocyanate are dissolved in about 340 parts of ethyl glycol acetate and heated to about 150° C. Over a period of about four hours about 68 parts of phenyl acetic acid are added dropwise to the reaction mixture. After the evolution of $CO_2$ has ceased, cyclohexane-1,4-diisocyanate and solvent are removed by thin-film distillation at about 0.15 mm. Hg. A tough, viscous resin (yield 213 parts), containing about 18.9% of NCO is obtained.

EXAMPLE 12

In each case about 336 parts of hexamethylene diisocyanate are reacted at about 160° C. in accordance with the procedure described in Example 1: (a) about 54 parts of 2-chloropropionic acid, (b) about 64 parts of dichloracetic acid and (c) about 51 parts of trimethyl acetic acid. After the evolution of $CO_2$ has subsided, excess hexamethylene diisocyanate is removed at about 0.2 mm. Hg in a thin-film evaporator. Colorless acylated urea polyisocyanates of oily consistency are obtained having the following yields and NCO— contents:

| Yield: | Percent NCO |
|---|---|
| (a) 198 g. | 18.3 |
| (b) 208 g. | 18.9 |
| (c) 195 g. | 20.4 |

EXAMPLE 13

Approximately 504 parts of hexamethylene diisocyanate are heated to about 160° C. Over a period of about three hours about 61 parts of ultra-pure benzoic acid, which has been freed from traces of metal salts and alkali by recrystallization from water, are added in increments. The crude product is thereafter freed at about 150° C./0.2 mm. Hg from excess hexamethylene diisocyanate. The viscous resin (about 190 parts) which is obtained as distillation residue has an NCO— content of 17.3%.

EXAMPLE 14

Approximately 1,250 parts of 4,4'-diisocyanatodiphenylmethane are heated to about 130° C. Over a period of about 5 hours about 290 parts of tall oil fatty acid are added dropwise to the reaction mixture. The reaction mixture is then heated for an additional three hours at about 140° C. until the evolution of $CO_2$ has ceased. A viscous solution of a urea polyisocyanate acylated with tall oil fatty acid is obtained in excess diphenylmethane-4,4'-diisocyanate having an NCO— content of 29.2%. Foamed plastics obtained from these polyisocyanate mixtures and hydroxyl containing polyesters exhibit an increased resistance to hydrolysis.

EXAMPLE 15

The procedure described in Example 14 is followed except a diphenylmethane-4,4'-diisocyanate containing about 5% polycarbodiimides obtained from this diisocyanate is employed. After the evolution of $CO_2$ has ceased, a mixture which is stable at room temperature and consists of polyisocyanates in excess of diphenylmethane-4,4'-diisocyanate is obtained. NCO=28.5%.

EXAMPLE 16

The procedure described in Example 15 is used except the diisocyanate employed therein is replaced with about 1400 parts of 1-methylbenzene-2,4-diisocyanate, wherein the diisocyanate is perchlorinated in the aromatic nucleus. Tall oil fatty acid is added dropwise over a period of about 6 hours. After the evolution of $CO_2$ is completed, a waxy mixture of acylated, chlorine-containing urea polyisocyanates in excess diisocyanate is obtained having an NCO— content of 30.4%.

EXAMPLE 17

In each of the following examples 1008 parts of hexamethylene diisocyanate are heated to 130° C. Over a period of about 5 hours and with agitation, the following mixtures are added:

(a) 30 parts of acetic acid and 9 parts of water,
(b) 30 parts of acetic acid and 37 parts of tert. butanol
(c) 30 parts of acetic acid and 45 parts of butane-1,4-diol
(d) 30 parts of acetic acid and 30 parts of trimethylol propane
(e) 30 parts of acetic acid and 20 parts of adipic acid
(f) 30 parts of acetic acid and 20 parts of adipic acid diamide
(g) 30 parts of acetic acid and 30 parts of -hydroxy butyric acid
(h) 30 parts of acetic acid and 25 parts of w-hydroxy butyric acid hydrazide
(i) 30 parts of acetic acid and 15 parts of w-aminocaproic acid
(j) 30 parts of acetic acid and 10 parts of N,N'-dimethyl-ethylenediamine
(k) 30 parts of acetic acid and 14 parts of trimethylamine After the addition is complete, the reaction mixture is heated for an additional two hours at 140° C. In Examples (a) through (k) clear solutions of polyisocyanate mixtures in excess hexamethylene diisocyanate are obtained having NCO— contents of between 29% and 34%. The solutions of polyisocyanate mixtures are of value in the production of relatively highly crosslinked light-fast foamed plastics.

EXAMPLE 18

The same procedure as used in Example 1 is followed wherein hexamethylene diisocyanate is used as reaction medium and, about 0.5 mol of the monocarboxylic acid derivatives listed in the table are used as the monocarboxylic acids. After completing the reaction, excess monomeric hexamethylene diisocyanate is removed by the procedure indicated in Example 1 and odorless polyisocyanates, soluble in conventional lacquer solvents and having the NCO values indicated in Table 1 are obtained.

TABLE 1

| No. | Monocarboxylic acid derivative | Yield (parts) | Percent NCO |
|---|---|---|---|
| 1 | [structure: HOOC-CH2-CH2-C(O)-OC4H9] | 230 | 17.2 |
| 2 | C4H9—O—C(O)—CH=CH—C(O)—OH | 229 | 17.5 |
| 3 | [cyclohexane with -C(O)-OH and -C(O)-O-C4H9] | 257 | 15.8 |
| 4 | [benzene with -C(O)-OH and -C(O)-OC4H9] | 254 | 16.2 |

TABLE 1.—Continued

| No. | Monocarboxylic acid derivative | Yield (parts) | Percent NCO |
|---|---|---|---|
| 5 | [cyclohexane with -C(O)-OH and -C(O)-OC4H9] | 255 | 15.5 |
| 6 | [chlorinated cyclohexane with -CH-C(O)-OH and -CH-C(O)-OC4H9] | 370 | 10.5 |
| 7 | [benzene with COOH and -C(O)-O-(CH2)7-CH3] | 253 | 16.5 |
| 8 | [cyclohexane with (CH2)7-C(O)-O-C4H9, (CH2)7-COOH, -CH2-CH=CH-(CH2)4-CH3, (CH2)5-CH] (Butyl semiester of dimerized linoleic acid) | 320 | 12.2 |
| 9 | CH2—C(O)—OH, CH2, C(O)—N(C4H9)(C4H9) | 260 | 15.3 |
| 10 | [cyclohexane with -C(O)-OH and -C(O)-N(C4H9)2] | 285 | 14.2 |
| 11 | [benzene with -C(O)-OH and -C(O)-N(C4H9)2] | 282 | 14.5 |
| 12 | [cyclohexane with (CH2)7-C(O)-N(C4H9)2, (CH2)7-C(O)-OH, -CH2-CH=CH-(CH2)4-CH3, (CH2)5-CH3] | 355 | 11.3 |
| 13 | HO—CH2—C(O)—OH | 268 | 23.5 |
| 14 | HS—CH2—C(O)—OH | 273 | 22.8 |

11

TABLE 1.—Continued

| No. | Monocarboxylic acid derivative | Yield (parts) | Percent NCO |
|---|---|---|---|
| 15 | Ricinoleic acid: 12-hydroxyocta-9-decanoic acid. | 377 | 16.2 |
| 16 | ![structure: p-nitrobenzoic acid, C(=O)—OH on benzene ring with NO2] | 227 | 17.7 |
| 17 | Adipic acid monoamides | 301 | 19.8 |
| 18 | $H_2N-(CH_2)_5-COOH$ | 294 | 20.8 |
| 19 | $CH_3-C(NH_2)=CH-COOH$ | 280 | 21.5 |
| 20 | $H_2N$—[cyclohexyl]—$C(=O)-OH$ | 301 | 19.5 |

It is to be understood that the foregoing examples are given for the purpose of illustration and that any other suitable organic polyisocyanate and organic monocarboxylic acid could have been used therein provided that the teachings of this disclosure are followed.

Although the invention has been described in considerable detail in the foregoing, it is to be understood that such detail is solely for the purpose of illustration.

What is claimed is:

1. A process for the preparation of acylated urea polyisocyanates which comprises reacting at a temperature of from about 90° C. to about 190° C. an organic diisocyanate with an organic monocarboxylic acid containing more than one carbon atom wherein the organic monocarboxylic acid is a saturated or unsaturated monocarboxylic acid selected from the group consisting of aliphatic monocarboxylic acids, cycloaliphatic monocarboxylic acids, araliphatic monocarboxylic acids, aromatic monocarboxylic acids, monocarboxylic acid semiesters of an aliphatic dicarboxylic acid, monocarboxylic acid semiesters of an aromatic dicarboxylic acid, N-disubstituted semiamides of an aliphatic dicarboxylic acid, N-disubstituted semiamides of a cycloaliphatic dicarboxylic acid, and N-disubstituted semiamides of an aromatic dicarboxylic acid in such proportions that there are at least 4 mols of organic diisocyanate present per mol of monocarboxylic acid.

2. The process of claim 1 wherein the reaction is carried out in the presence of an inert organic solvent.

3. The process of claim 1 wherein about 4 to 15 mols of organic diisocyanate are initially present per mol of monocarboxylic acid.

4. The process of claim 1 wherein an excess of at least 2 mols of organic diisocyanate are always present during the reaction with the monocarboxylic acid.

5. The process of claim 1 wherein the reaction is carried out at a temperature of from about 130° C. to about 165° C.

6. The process of claim 1 wherein the organic diisocyanate is first reacted with an organic monocarboxylic acid at a temperature of from about 20° C. to about 40° C. and thereafter increasing the temperature to from about 90° C. to about 190° C. in the presence of excess organic diisocyanate to form an acylated urea polyisocyanate containing biuret polyisocyanates.

7. The process of claim 1 wherein the organic monocarboxylic acid is added at such a rate that the concentration in the reaction medium is below 0.8%.

12

8. The process of claim 1 wherein the organic diisocyanate is selected from the group consisting of tetramethylene diisocyanate, pentamethylene diisocyanate, hexamethylene diisocyanate, 1,4-diisocyanatocyclohexane, 1,3-diisocyanatocyclohexane, 4,4'-diisocyanato dicyclohexylmethane, xylylidene diisocyanate, 1,2-diisocyanatocyclobutane, 1-methylbenzene-2,4-diisocyanate, 1-methylbenzene-2,6-diisocyanate, mixtures of 1-methylbenzene-2,4-diisocyanate and 1-methylbenzene-2,6-diisocyanate, chlorinated 1-methylbenzene-2,4-diisocyanate and chlorinated 1-methylbenzene-2,6-diisocyanate, 1-methoxybenzene-2,4-diisocyanate, 1-chlorobenzene-2,4-diisocyanate, alkyl substituted 1-methoxybenzene-2,4-diisocyanate, alkyl substituted 1-chlorobenzene-2,4-diisocyanate, chlorine substituted 1-methoxybenzene-2,4-diisocyanate, chlorine substituted 1-chlorobenzene-2,4-diisocyanate, diphenylmethane-4,4'-diisocyanate, p-phenylenediisocyanate and m-phenylenediisocyanate.

9. The process of claim 8 wherein the organic diisocyanate is selected from the group consisting of toluylene diisocyanate or hexamethylene diisocyanate and the organic monocarboxylic acid is selected from the group consisting of acetic acid, 2-ethyl-caproic acid, a tall oil fatty acid, a semiester of hexahydrophthalic acid, a semiamide of hexahydrophthalic acid, a semiester of the Diels-Alder adduct of hexachlorocyclopentadiene and maleic anhydride, or a semiamide of the Diels-Alder adduct of hexachlorocyclopentadiene and maleic anhydride.

10. A composition of the formula

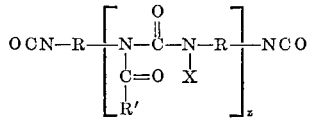

wherein R is a radical selected from the group consisting of alkylene, cycloalkylene, arylene or substituted arylene with the proviso that the substituents are selected from the group consisting of alkoxy and chloro, R' is the radical remaining after removal of a —COOH group from an organic monocarboxylic acid containing more than one carbon atom wherein the monocarboxylic acid is a satuarted or unsaturated monocarboxylic acid selected from the group consisting of aliphatic monocarboxylic acids, cycloaliphatic monocarboxylic acids, araliphatic monocarboxylic acids, aromatic monocarboxylic acids, monocarboxylic acid semiesters of an aliphatic dicarboxylic acid, mooncarboxylic acid semiesters of a cycloaliphatic dicarboxylic acid, monocarboxylic acid semiesters of an aromatic dicarboxylic acid, N-disubstituted semiamides of an aliphatic dicarboxylic acid, N-disubstituted semiamides of a cycloaliphatic dicarboxylic acid, and N-disubstituted semiamides of an aromatic dicarboxylic acid, X is selected from the group consisting of hydrogen and —CO—NH—R—NCO wherein R is as defined above and z is an integer of from 1 to 5.

11. The composition of claim 10 wherein R' is substituted with a member selected from the group consisting of halogen, nitro,

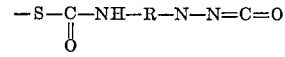

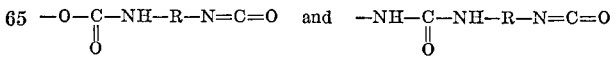

wherein R is as defined in claim 10.

References Cited

UNITED STATES PATENTS 3,350,438    10/1967    Hennig.

(Other references on following page)

OTHER REFERENCES

Helvetica Chimica Acta (1934), vol. 17, p. 934 [Reactions of Isocyanates with Organic Acids].

Chem. Abstratcs, vol. 59, p. 6406 (1962), [As Abstracted from Angew, Chem. 74, 799–801 (1926)] "Low-molecular-Weight Polyisocyanates with Biuret Structure."

NICHOLAS S. RIZZO, Primary Examiner

R. V. RUSH, Assistant Examiner

U.S. Cl. X.R.

260—2.5, 31.8, 453, 77.5